Figure 1:
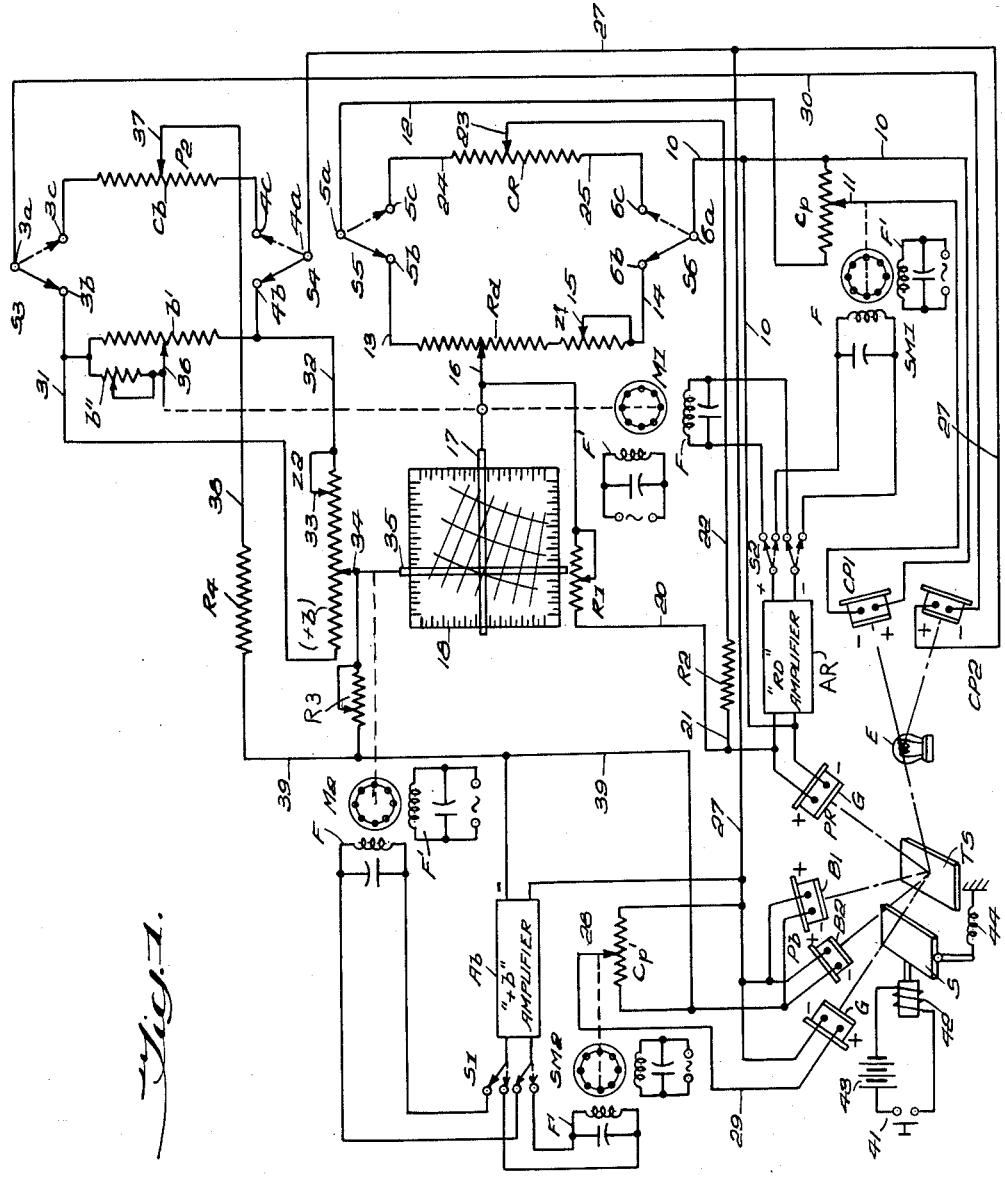

United States Patent Office 3,020,793
Patented Feb. 13, 1962

3,020,793
AUTOMATIC PHOTOELECTRIC COLORIMETER
David A. Neubrech, Takoma Park, Md., and Matthew A. Cattaro, Vienna, Va., assignors to Gardner Laboratory, Inc., Bethesda, Md., a corporation of Maryland
Filed Apr. 20, 1960, Ser. No. 23,515
3 Claims. (Cl. 88—14)

This invention relates to automatic photoelectric colorimeters and more particularly to colorimeters for automatic measurement of numerical values for identification of a color on scales of approximately uniform color-preception spacing.

In United States Patent No. 2,696,750, granted December 14, 1954, to Richard S. Hunter, a colorimeter of the above type is disclosed and which includes a color diagram bearing significant numerical values and crossed pointers movable with respect to the color diagram by mechanisms for measuring the light-dark and chroma values of cotton specimens in terms of luminous reflectance ($Rd$) and yellow ($+b$), respectively. As explained in that patent, in the grading of materials or specimens, such as cotton, which have only a limited range of color variation, it is sufficient to measure only the two tristimulus factors named. In accordance with that patent, two inter-dependent electrical networks are used for balancing respectively the current outputs of self-generating photocells which measure the $Rd$ and $+b$ factors against fractions of the substantially higher current output of a single comparison photocell which is common to the two measuring circuits. Reversible motors connected respectively to the pointers for moving them across the diagram along paths perpendicular to each other are driven in one direction or the other dependent upon the amplitude of the $Rd$ and $+b$ factors. In order to compensate for variations in the characteristics of the photocells and other extraneous factors, the system includes an arrangement by which the instrument is rendered continuously self-standardizing during periods between measuring operations. When in the self-standardizing position, a "Standard" specimen (e.g. cotton), with known luminous reflectance and chroma values is substituted for the test specimen, and other reversible motors are used respectively for automatically adjusting the positions of the comparison photocell and the "green" photocell of the photocell combination $Pb$ respectively to establish a balance for calibrating potentiometer settings which are determined in accordance with the luminous reflectance and chroma values of a particular standard specimen.

With the arrangement as disclosed in the prior Hunter patent, the fact that the $Rd$ and $+b$ electrical networks were made inter-dependent led to considerable difficulties in calibrating the colorimeter and also in the adjustment of the sensitivity or expanded scale displacements of the $+b$ pointer at low values of the luminous reflectance of a test specimen. These difficulties were due principally to the fact that the automatic $Rd$ and $+b$ measuring potentiometers of the two networks were interconnected electrically in parallel through taps on the potentiometers. Consequently, any adjustment made at the low end of the $Rd$ potentiometer winding or the $Rd+b$ sections produced not only a change in the $+b$ but also in the $Rd$ network thus causing not only erroneous expansion, or contraction problems but also lengthy time wasting efforts to obtain fairly accurate calibration of the colorimeter.

A major object of the present invention is to overcome this difficulty and this objective is attained by making the $Rd$ and $+b$ electrical networks electrically independent. Consequently, each network can be calibrated independently of the other and in a shorter period of time, and closer control can be maintained over the desired expanded scale displacements of the $+b$ pointer for lower values of the luminous reflectance of a test specimen, i.e. for a test specimen of a so-called darker color.

Another disadvantage of the circuit arrangement disclosed in the prior Hunter patent is that restandardization of the colorimeter, which takes place continuously in the intervals between grading of test specimens, involves physical adjustment of some of the photocells, particularly the comparison photocell and the photocell of the $Pb$ group having the green filter. The change in position of the photocells results in a change in the optical geometry of the colorimeter which leads to an incorrect interpretation of color values due to the variation in gloss factor. Also, since the photocells in the prior Hunter patent were pivotally mounted, the pivotal adjustment resulted in a tilting of the filter element which varied the density or color of the filter thereby introducing a slight increase in the red portion of the spectrum and density of the filter and therefore changing characteristics of the intended response of the filter and photocell combinations. With the improved construction according to the present invention, this disadvantage has been eliminated by the inclusion of automatic potentiometers in the outputs of the above-mentioned photocells which are adjusted as may be necessary during restandardization of the colorimeter to compensate for any changes which may take place and which might otherwise throw the colorimeter out of calibration.

Figure 2:
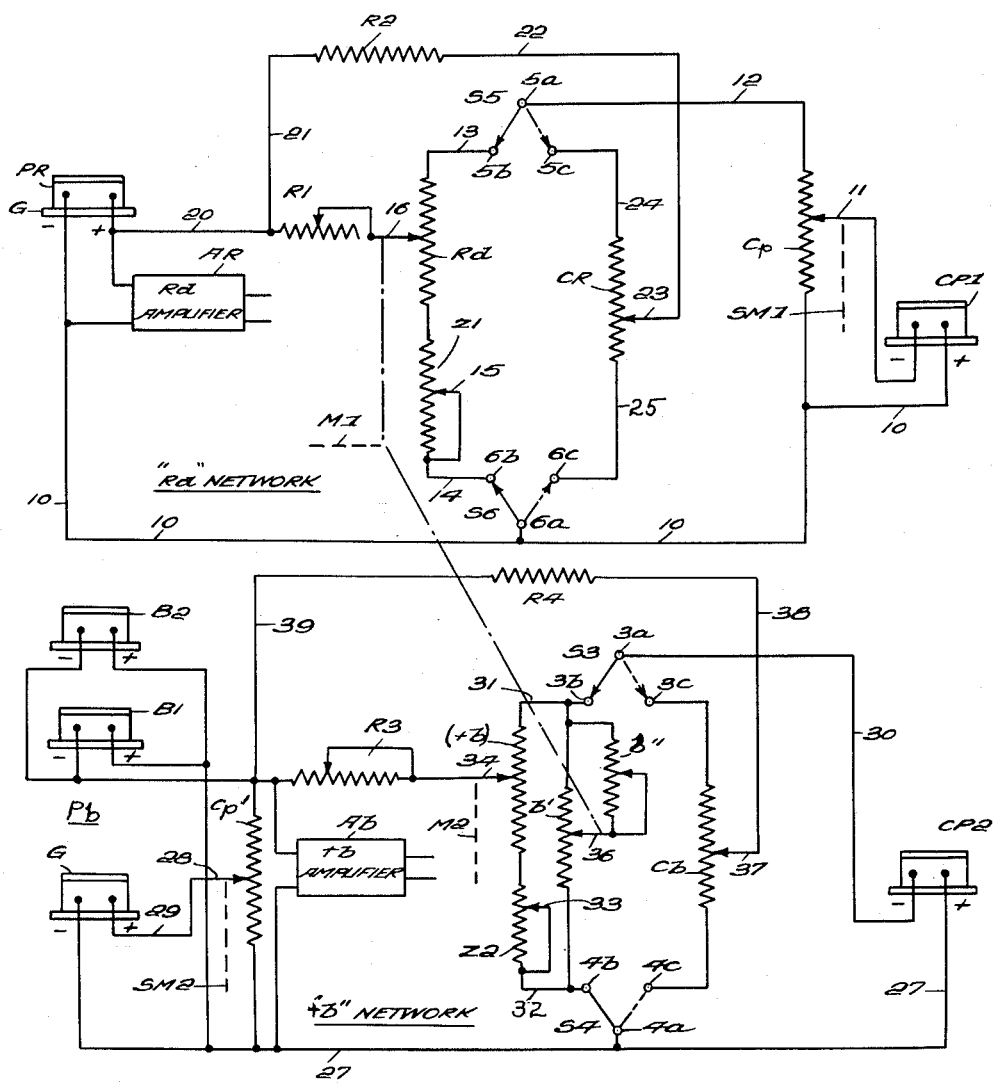

The foregoing objects and advantage inherent in the invention will become more apparent from the following detailed description of a preferred embodiment thereof and from the accompanying drawings as to which:

FIG. 1 is a combined electrical and optical schematic view of the improved colorimeter, and FIG. 2 is a schematic view of the electrical circuits only, this view being included to more clearly show the independence from an electrical point of view of the $Rd$ network from the $b$ network.

With reference now to FIG. 1, the reference character E designates a light source for illuminating a test specimen TS of cotton from which light is reflected perpendicularly to a current generating photocell PR which is covered by a green filter G. This photocell provides the "$Rd$" scale current. Light from the source is also reflected perpendicularly to a photocell group or combination $Pb$ comprising three photocells. Two of these photocells are covered by blue filters B1 and B2 and the outputs of these cells are connected in parallel. The third photocell is covered by a green filter G and its output is connected with reversed polarities, i.e. in opposition to the combined output of the other two photocells with the blue filters B1 and B2. The relative areas of the photocells which constitute the $Pb$ group and the transmission characteristics of their respective blue and green filters are such that the net positive current output from the group provides the "$+b$" scale current which is proportional to the reflectance difference between the blue and yellow-green regions of the spectrum on the same scale that the current output from the photocell PR is a measure of the luminous reflectance $Rd$ of the specimen. The light source E also illuminates two comparison photocells CP1 and CP2 to develop constant currents respectively of an order substantially higher than the current outputs of the photocells which are illuminated by reflectance from the test specimen. It is to be understood that the test specimen might be so arranged that it transmits light therethrough to the photocells but, for the convenience in description and for the specific case of a cotton colorimeter, the invention will be described on the assumption that light is reflected from the test specimen to the measuring photocells.

As explained above, one of the principal distinctions between the improved circuitry of the present invention and that disclosed in the prior arrangement according to the disclosure in the Hunter Patent No. 2,696,750 is that the electrical network associated with measurement of the "R$d$" factor of the test specimen is independent of the network associated with measurement of the specimen's "+$b$" factor.

With the various switches S1 to S6, in the positions indicated by solid lines in the drawings, and with reference to FIG. 2 in particular, the network associated with the R$d$ measurement of the test specimen includes the comparison photocell CP1 previously mentioned having its positive terminal connected by conductor 10 to one end of a self-standardizing 1,000 ohm potentiometer C$p$. The positive terminal of comparison photocell CP1 is also connected via conductor 10 to terminal 6$a$ of switch S6, and also to the negative output terminal of photocell PR which is also connected to one input terminal of amplifier AR. The slide wire tap 11 of potentiometer C$p$ is actuated by a reversible motor SM1, operation of which will be later explained in conjunction with the continuous restandardization feature of the invention when a test specimen is not being measured. The opposite end of potentiometer winding C$p$ is connected via conductor 12 to terminal 5$a$ of switch S5. This connection continues through the blade of the switch to terminal 5$b$ and from the latter via conductor 13 to one end of a 50 ohm potentiometer winding R$d$. The lower end of the latter is connected to one end of a manually adjustable variable resistor Z1 which serves as a zero adjuster, and the opposite end of the latter is connected via conductor 14 to terminal 6$b$ of switch S6 and through the blade of this switch and terminal 6$a$ to conductor 10. The tap 15 on variable resistor Z1 is manually adjustable but the tap 16 on potentiometer R$d$ is actuated by a reversible readout motor M1 which operates to shift the tap 16 in one direction or the other when a test specimen is being evaluated. Mechanically coupled to tap 16 and motor M1 is a pointer 17 which moves parallel to itself in a vertical direction over the color diagram 18. A connection from tap 16 extends through a manually adjustable 10,000 ohm variable resistance R1 and from the latter via conductor 20 to the positive terminal on photocell PR and to one side of the input to amplifier AR, and also via conductor 21 through resistance R2, which can be an approx. 2.2K carbon resistor, and conductor 22 to tap 23 on a 50 ohm calibrating potentiometer CR which is set manually in accordance with the known luminous reflectance value of a standard specimen S which is automatically moved into position in the optical path between the light source E and the various photocells and remains there except when a test specimen TS is being evaluated. One end of the calibrating potentiometer winding CR is connected via conductor 24 to terminal 5$c$ of switch S5 and the other end of this winding is connected via conductor 25 to terminal 6$c$ of switch S6.

*Operation of the "R$d$" network*

The output current generated by the comparison photocell CP1 is applied to potentiometer C$p$ via the tap 11 which is adjusted by motor SM1 to a position on the potentiometer winding determined by the luminous reflectance value of a standard specimen. The voltage across the ends of the potentiometer winding, i.e. at conductors 10, 12 is applied via switches S5 and S6 to the series arranged potentiometer R$d$ and resistor Z1. Resistor Z1 acts as a zero adjuster. This produces a current flow proportional to the position of tap 16 to the input of amplifier AR and which opposes a current, applied in opposition, to the current generated by the photocell PR and which is also connected to the input of amplifier AR. The difference between these two currents constitutes the effective input to the amplifier AR, and the output of amplifier AR is applied via switch S2 to field winding F of readout motor M1 so as to control its direction of rotation in accordance with the sense of the difference between the current from photocell PR and the current from potentiometer R$d$. Motor M1 which can be of the induction type includes another field winding F' which is continuously energized from an alternating current source AC. The amplifier AR is of the electronic multi-tube type and is energized from a suitable source of power, not shown. The arrangement is such that movement of the tap 16 in one direction or the other by motor M1 serves to establish a voltage balance at the input to the amplifier AR so that tap 16 and hence the pointer 17 attached thereto will seek a balanced position dependent upon the current output of photocell PR and which therefore constitutes a measure of the "R$d$" i.e. "whiteness" value of the test specimen.

The network associated with the "+$b$" measurement of the test specimen is electrically independent of the "R$d$" network and this independence is apparent from FIG. 2. Included in the "+$b$" network is a second comparison photocell CP2 having its positive terminal connected by conductor 27 to terminal 4$a$ of switch S4. Conductor 27 also is connected to the negative output terminal of the photocell in the P$b$ group having the green filter G, to the positive terminals of the two paralleled photocells in the P$b$ group having the blue filters B1 and B2, to one input terminal of the "+$b$" amplifier A$b$ and to one end of an automatic standardizing 1,000 ohm-potentiometer C$p'$. The tap 28 on potentiometer C$p'$ is actuated automatically by a reversible motor SM2 when the colorimeter is being restandardized, and it is connected via conductor 29 to the positive terminal of the photocell in the P$b$ group with the green filter.

To the opposite end of the standardizing potentiometer C$p'$ are connected the parralleled negative output terminals of the photocells in the P$b$ group with the blue filters B1 and B2, the other input terminal of the "+$b$" amplifier A$b$ and one end of a manually adjustable 10,-000 ohm variable resistance R.

The negative output terminal of comparison photocell CP2 is connected via conductor 30 to terminal 3$a$ of switch S3 and extends through the blade of this switch and terminal 3$b$ and conductor 31 to one end of a 50 ohm (+$b$) potentiometer. The opposite end of the latter is connected to one end of resistor Z2 and conductor 32 connects the opposite end of the latter to terminal 4$b$ on switch S4. The tap 33 on resistor Z2 is manually adjusted for zeroing purposes and the tap 34 on potentiometer (+$b$) is actuated by a reversible motor M2 in one direction or the other when a test specimen is being evaluated. Mechanically coupled to tap 34 and motor M2 is the pointer 35 which moves parallel to itself in a horizontal direction over the color diagram 18. An electrical connection extends from tap 34 to the opposite end of variable resistance R3.

Connected in parallel with potentiometer (+$b$) and zero adjustment resistor Z2 is a 50 ohm exponential potentiometer $b'$ having a tap 36 which is actuated in one direction or the other by the same reversible motor M1 which is used to actuate the tap 16 on potentiometer R$d$ of the R$d$ network. Consequently, as motor M1 shifts the position of tap 16 on the potentiometer R$d$ it will likewise shift the position of tap 36 on potentiometer $b'$. A manually adjustable 20 ohm variable, exponential trimming potentiometer $b''$ is connected between one end of the potentiometer winding $b'$ and tap 36 on the latter.

A calibrating 50 ohm potentiometer C$b$ is connected between terminals 3$c$ and 4$c$ of switches S3 and S4, and a tap 37 on this potentiometer, which is set manually in accordance with the known "+$b$" i.e. chroma value of the standard specimen, is connected via conductor 38 to one end of resistor R4 which can be an approximate 2.2K carbon type. The opposite end of this resistor is connected via conductor 39 to an input terminal of amplifier A$b$ and also to the negative output terminals of the photocells of the P$b$ group with the blue filters.

*Operation of the +b network*

The output current generated by the comparison photocell CP2 is applied through switches S3 and S4 across the two potentiometers (+$b$) and $b'$ in parallel, and the relative current flows through the same are determined by the position of tap 36 on potentiometer $b'$ which is mechanically coupled to motor M1 and hence takes a position determined by the position of tap 16 on the R$d$ potentiometer of the R$d$ network. The arrangement is such that as the "R$d$" characteristic of the test specimen drops in value, the "+$b$" will expand through the interconnection of the two potentiometers R$d$ and $b'$ and hence provide a better distinction between darker colors. The trimming potentiometer $b''$ controls the amount of the "+$b$" expansion.

The current output from the (+$b$) potentiometer is applied in opposition to the current output of the photocell of the P$b$ group with the green filter and is also applied across the input to the A$b$ amplifier. The other two photocells, with blue filters B1 and B2, of the P$b$ group are connected in parallel opposition to the photocell having the green filter thereby producing a current value proportional to the green minus blue function of the test specimen. Any unbalance between the current representative of the G—B function and the current from the $b$ potentiometer is then effective to produce rotation of induction motor M2, connected to the output of amplifier A$b$, in such direction as to restore balance. Amplifier A$b$ is the same type as amplifier AR and motor M2 is the same type as motor M1. The arrangement is such that movement of the tap 34 on potentiometer (+$b$) in one direction or the other by motor M2 serves to establish a voltage balance at the input to amplifier A$b$ so that tap 34 and hence the pointer 35 attached thereto will seek a balanced position dependent upon the amplitude of the G—B relation and which therefore constitutes a measure of the "+$b$" value of the test specimen.

It has been explained that the colorimeter is always in the "restandardizing" position except when a test specimen TS is being measured as to its "R$d$" and "+$b$" factors, and that a standard specimen S having known "R$d$" and "+$b$" characteristics is then automatically substituted for the test specimen.

The arrangement for this is shown in FIG. 1 and can be substantially the same as in the prior patent to Hunter, No. 2,696,750. When a specimen TS is to be tested, switch 41 is closed such as by a foot treadle to thus energize a solenoid 42 from a power source represented by battery 43 and the armature of this solenoid which is coupled to the standard specimen S withdraws the latter to the position indicated in FIG. 1 thus placing the test specimen TS in the optical path between light source E and the several photocells. This automatically also causes the switches S1 and S6 to move to their "test" positions which are the positions shown by the solid lines in FIG. 1. The automatic operation of these switches is not detailed since it forms no part of the present invention. However, the arrangement can be effected by relays in a manner similar to that as disclosed in the prior Hunter Patent No. 2,696,750.

When the "R$d$" and "+$b$" values of the test specimen have been noted by the positions of the pointers 17 and 35 on color diagram 18, switch 41 is released thus deenergizing solenoid 42 and causing the standard specimen S to be moved back by restoring spring 44 into the optical path between the light source E and the various photocells. At the same time, switches S1 to S6 are automatically thrown over to the positions indicated by the broken lines. The apparatus is now in the restandardizing position.

*Restandardization*

Photoelectric measuring circuits in which the current output of a measuring photocell is balanced against a fraction of a constant current of a higher order, for example, an order of 100 times the magnitude of the measuring current, are of high sensitivity and consequently are subject to error from relatively small variations in the operating characteristics of the photocells, the electronic amplifier and the transmission efficiencies of the several light paths employed in the optical system. Continuous restandardization is therefore essential for accurate measurement of color factors. In the previous Hunter Patent No. 2,696,750, the colorimeter included means continuously operative during intervals between measurements of test specimens to maintain the standardization or initially established accuracy of the measuring apparatus. In particular, that patent included restandardization networks comprising manually adjustable standardizing potentiometers which were substituted for the automatic potentiometers of the "R$d$" and "+$b$" measuring networks, and a pair of reversible motors which were connected across the output terminals of the respective amplifiers for the purpose of adjusting the positions of certain of the photocells with respect to the light source in such manner as to establish voltage balances at the input terminals of the amplifiers when the taps on the manually adjustable potentiometers were set at the known reflectance "R$d$" and chroma "+$b$" values of a standard specimen S.

It has been found, however, that restandardization by physical adjustment of the photocells is not entirely satisfactory since it changes the optical geometry in relation to the specimen and photocell. Where gloss from the face of one cell would strike another, giving an incorrect interpretation of the color values, i.e. including gloss value which should not have been included. This was a factor introduced which caused erroneous readings translated electrically to the color diagram. Also, since the photocell was pivotally mounted, its adjustment resulted in a tilting of the filter element thereof which varied the density or color of the filter, introducing a slight increase in the red portion of the spectrum and density of the filter and therefore changing characteristics of the intended filter and photocell combination's response.

With the restandardization arrangement of the present application, the photocells remain stationary and the necessary adjustment to reattain a balanced condition is done in an electrical manner. The electrical circuits of the networks therefore will not vary since the photocells always face the greatest amount of energy as received from the specimen, i.e. the photocells always view the specimen perpendicularly.

As is better seen from an inspection of FIG. 2, for restandardization of the "R$d$" network, the manually adjustable calibrating potentiometer CR is substituted for the automatically adjustable potentiometer R$d$ when switches S5 and S6 are thrown to the positions indicated by broken lines, and the tap 23 on potentiometer CR is set to a position corresponding to the known luminous reflectance value of the standard specimen S. Reversible motor SM1 connected by switch S2 to the output of amplifier AR will now be caused to rotate in such direction as will adjust the tap 11 on the self-standardizing potentiometer C$p$ in such direction as will reestablish a voltage balance at the input to amplifier AR.

For restandardization of the "+$b$" network, the manually adjustable calibrating potentiometer C$b$ is substituted for the automatically adjustable potentiometer (+$b$) whenever switches S3 and S4 are thrown to the positions indicated by broken lines, and the tap 37 on potentiometer C$b$ is set to a position corresponding to the known chroma value of the standard specimen S.

Reversible motor SM2 connected by switch S1 to the output of amplifier Ab will now be caused to rotate in such direction as will adjust the tap 28 on the self-standardizing potentiometer Cp' in such direction as will reestablish a voltage balance at the input to amplifier Ab.

*Calibration*

With the arrangement as disclosed in the prior Hunter Patent No. 2,696,750, the "Rd" and "+b" networks were interdependent and this led to much difficulty both in calibrating the colorimeter and also adjusting the sensitivity or expanded scale displacement of the +b pointer at low values of the luminous reflectance of a test specimen. These difficulties were due principally to the fact that the Rd and (+b) potentiometers were connected electrically in parallel through the tap on the Rd potentiometer. Consequently, any change made in the zero adjustment at the low end of the Rd potentiometer winding or the Rd +b sections produced a change not only in the +b but also in the Rd network thus causing not only erroneous expansion, or contraction, problems but also lengthy time wasting efforts to obtain a fairly accurate calibration of the colorimeter.

With the improved circuitry of the present invention these problems have been overcome by virtue of the fact that the "Rd" and "+b" electrical networks have been made electrically independent of each other. This independence of the two networks is believed to be self-evident from a study of FIG. 2. Each network has its own comparison cell and the circuits of one network are not coupled electrically in any respect with the circuits of the other network. There is, of course, a mechanical coupling between the tap on the Rd potentiometer and the tap on the b' potentiometer but this is effective only when the colorimeter is operating to measure the Rd and +b factors of a test specimen. Consequently, this mechanical coupling has no effect upon the calibration of either network. With the improved circuitry featuring electrical independence of the Rd and +b networks, the zero controls at the low ends of the Rd and (+b) potentiometers can be adjusted separately and therefore expansion of the scale can be made separately. Also, the most important scale expansion factor as determined by the setting of the exponential trimming potentiometer b'' can be adjusted separately instead of having to juggle the Rd and the Rd+b as was necessary in the prior circuit in order to obtain an appropriate ratio from the single comparison cell.

In order to calibrate the colorimeter, five standards are used. One of these is a "white" and the other four have lesser degrees of whiteness. The so-called "white" standard is placed on the sample area which is the optical position represented by TS in FIG. 1. Push button switch 41 is then closed and held closed until the crossed pointers 17 and 35 come to rest on the diagram 18. If these pointers do not intersect at a point coincident with a point on the diagram which has been predetermined for the "white" standard, switch 41 is then opened which causes the switches S1 to S6 to shift to their restandardizing positions and a standard specimen S to move into the optical path between the light source and the various photocells. The standard specimen S is identical so far as possible to the "white" standard placed at the sample position TS. A slight change is made in the setting of tap 23 on the calibrating potentiometer CR which then causes motor SM1 to adjust the setting of tap 11 on potentiometer Cp of the Rd network until a balance condition for the new setting of potentiometer CR has been obtained. Switch 41 is then reclosed until the crossed pointers again come to rest. The adjustment made in the setting of potentiometer CR results in a movement of pointer 17 up or down until it is coincident with the required point on the diagram. After pointer 17 has thus been adjusted, pointer 35 is made to take the proper position right or left so as to coincide with this same required point by effecting similar manual adjustment of tap 37 on calibrating potentiometer Cb in the +b network, it being noted that the balance condition for each trial setting of the calibrating potentiometer Cb is effected by an adjustment of the tap 28 on potentiometer Cp' associated with the green filter photocell of the Pb group by motor SM2.

The "white" standard is then replaced in turn by each of the four other standards of lesser whiteness and a calibrating procedure followed for each of these standards. However, instead of making an adjustment of the potentiometers CR and Cb to bring the crossed pointers to the proper points of intersection on the diagram 18 predetermined for these samples, the Rd network is calibrated by adjusting either the series resistor R1 connected directly to tap 16 on the Rd potentiometer winding or the resistor Z1 at the lower end of this winding. Similarly, the +b network is calibrated by adjusting either the series resistor R3 connected directly to the tap 34 on the (+b) potentiometer winding or the resistor Z2 at the lower end of this winding and the exponential potentiometers b' and b''.

After the colorimeter has been calibrated for the four other standards, the so-called "white" standard is then reinserted to recheck the calibration and the point of intersection of the pointers is again noted. If the colorimeter is now in proper calibration for all five standard samples, the pointers should come to rest at the proper point on the diagram predetermined for this sample. If this does not happen, then the entire calibrating procedure as outlined above is repeated until the desired accuracy of calibration for all five samples has been attained.

Consequently, in view of the electrical separation of the networks, it will now be evident that when calibrating the Rd network, no changes are effected in calibration of the +b network and, for similar reasons, when calibrating the +b network, no changes will be effected in the calibration of the Rd network. Thus, each network can be calibrated independently of the other.

We claim:

1. In an automatic photoelectric colorimeter for measuring the luminous reflectance (Rd) and chroma (+b) values of a test specimen, an "Rd" network and a "+b" network electrically independent from said "Rd" network, each of said networks including an automatic measuring potentiometer having a tap thereon actuated by a reversible motor, a calibrating potentiometer having a manually adjustable tap thereon, a self-standardizing potentiometer having a tap thereon actuated by a reversible motor and a comparison photocell, first photocell means for said "Rd" network equipped with a green filter conditioning the same to develop a current proportional to the luminous reflectance value of a test specimen, one output terminal of said first photocell means being connected to the taps on the associated automatic measuring and calibrating potentiometers and the other output terminal being connected selectively through switching means to one end of the associated automatic measuring potentiometer or to one end of the associated calibrating potentiometer, second photocell means for said "+b" network including one photocell equipped with a blue filter and another photocell equipped with a green filter having its output terminals connected respectively to the tap and one end of the associated self-standardizing potentiometer, circuit means interconnecting last said potentiometer with said blue filter equipped photocell to develop a current at output terminals proportional to the difference therebetween and which is proportional to the chroma value of the test specimen, one of last said output terminals being connected to the taps on the associated automatic measuring and calibrating potentiometers and the other of last said output terminals being connected selectively through switching means to one end of the associated automatic measuring potentiometer or to one end of the associated calibrating potentiometer, circuit means connecting the output from the comparison photocell of said "Rd" network to the self-standardizing potentiometer thereof and from the latter through selective switching means alternatively to the ends of the automatic measuring or the calibrating potentiometers of said "R$d$" network, circuit means connecting the output from the comparison photocell of said "+$b$" network through selective switching means alternatively to the ends of the automatic measuring or the calibrating potentiometers of said "+$b$" network, an auxiliary potentiometer connected in parallel with the automatic measuring potentiometer of said "+$b$" network and having a tap thereon actuated by the reversible motor means which actuates the tap on the automatic measuring potentiometer of said "R$d$" network, a first amplifier responsive to any difference between the current proportional to the luminous reflectance value of the test specimen and the current through the automatic measuring potentiometer or alternatively the current through said calibrating potentiometer of said "R$d$" network produced by the comparison photocell for actuating the corresponding reversible motor and tap on said automatic measuring potentiometer or alternatively the tap on said self-standardizing potentiometer to balance said currents, a second amplifier responsive to any difference between the current proportional to the chroma value of the test specimen and the current through the automatic measuring potentiometer or alternatively the current through the calibrating potentiometer of said "+$b$" network produced by the comparison photocell for actuating the corresponding reversible motor and tap on said automatic measuring potentiometer or alternatively the tap on said self-standardizing potentiometer to balance said currents, a light source, means for supporting a standard specimen having known luminous reflectance and chroma values and for supporting a test specimen of unknown luminous reflectance and chroma values, means for illuminating said comparison photocells directly from said light source, and means for illuminating from said light source in an alternative manner said test specimen or said standard specimen and reflecting light therefrom to said photocells of said "R$d$" and "+$b$" networks.

2. In an automatic photoelectric colorimeter, the invention as defined in claim 1, in combination with a color diagram, and crossed pointers movable by the respective automatic measuring potentiometers of said "R$d$" and "+$b$" networks relative to said color diagram, said color diagram including significant indicia such that the intersection of said pointers identifies the luminous reflectance and chroma values of the test specimen.

3. In an automatic photoelectric colorimeter for measuring the luminous reflectance (R$d$) and a chroma (+$b$) values of a test specimen, an "R$d$" network comprising a first comparison photocell, first photocell means provided with a green filter conditioning the same to develop a current proportional to the luminous reflectance value (R$d$) of the test specimen, a first self-standardizing potentiometer having a tap thereon adjustable by a first reversible motor, circuit means connecting the output from said first comparison photocell across the tap and one end of said self-standardizing potentiometer, an R$d$ potentiometer having a tap thereon adjustable by a second reversible motor, a first calibrating potentiometer having a manually adjustable tap thereon, circuit means including a first switching means for alternatively connecting the ends of said self-standardizing potentiometer to the ends of said first calibrating potentiometer or to the ends of said R$d$ potentiometer, circuit means connecting one side of the output from said first photocell means through said first switching means to one end of said R$d$ potentiometer or to one end of said calibrating potentiometer and connecting the other side of said output to the taps on said R$d$ and said first calibrating potentiometers such that the current through said R$d$ potentiometer or alternatively through said first calibrating potentiometer as determined by said first switching means opposes the current output from said first photocell means, a first amplifier producing an output proportional to any difference between said currents, and circuit means including a second switching means for connecting said first amplifier output to said second reversible motor to adjust the tap on said R$d$ potentiometer in such direction as to balance said currents or alternatively for connecting said first amplifier output to said first reversible motor to adjust the tap on said self-standardizing potentiometer in such direction as to balance said currents; a "+$b$" network electrically independent of said "R$d$" network comprising a second comparison photocell, second photocell means, said second photocell means including a first photocell provided with a blue filter and a second photocell provided with a green filter, a second self-standardizing potentiometer having a tap thereon adjustable by a third reversible motor, circuit means connecting the output from said second photocell across the tap and one end of said second self-standardizing potentiometer, circuit means connecting the output from said second self-standardizing potentiometer in opposition to the output from said first photocell so as to develop a second current output proportional to the difference therebetween and which is therefore also proportional to the yellowness factor "+$b$" of the test specimen, a (+$b$) potentiometer having a tap thereon adjustable by a fourth reversible motor, a second calibrating potentiometer having a manually adjustable tap thereon, circuit means including third switching means for alternatively connecting the output of said second comparison photocell to the ends of said (+$b$) potentiometer or to the ends of said second calibrating potentiometer, circuit means connecting one side of said second output to the taps on said (+$b$) and second calibrating potentiometers and connecting the other side of said second output through said third switching means to one end of said (+$b$) potentiometer or to one end of said second calibrating potentiometer such that the current through said (+$b$) potentiometer or alternatively through said second calibrating potentiometer as determined by said third switching means opposes said second current output, a second amplifier producing an output proportional to said second current output, circuit means including a fourth switching means for connecting said second amplifier output to said fourth reversible motor for adjusting the tap on said (+$b$) potentiometer in such direction as to balance said currents or alternatively for connecting said second amplifier output to said third reversible motor to adjust the tap on said second self-standardizing potentiometer in such direction as to balance said currents, an auxiliary potentiometer connected in parallel with said (+$b$) potentiometer and having a tap thereon and means interlinking the tap on said R$d$ potentiometer with the tap on said auxiliary potentiometer; a light source; means for supporting a standard specimen having known luminous reflectance and chroma values and a test specimen of unknown luminous reflectance and chroma values, means for illuminating said first and second comparison photocells directly from said light source; means for illuminating from said light source in an alternative manner said test specimen or said standard specimen and reflecting light therefrom to the remainder of said photocells; a color diagram; and pointers movable by said second and fourth reversible motors with respect to said color diagram.

No references cited.